Feb. 14, 1933.  D. F. SPROUL  1,897,738
CUSHIONING DEVICE
Filed Oct. 22, 1931

Inventor
Donald F. Sproul
By Gillson, Mann & Co.
Attys.

Patented Feb. 14, 1933

1,897,738

UNITED STATES PATENT OFFICE

DONALD F. SPROUL, OF CHICAGO, ILLINOIS, ASSIGNOR TO CARDWELL WESTINGHOUSE COMPANY, A CORPORATION OF DELAWARE

CUSHIONING DEVICE

Application filed October 22, 1931. Serial No. 570,394.

The invention relates to cushioning devices such as are especially adapted for use in supporting the bolsters of railway cars; its object being to simplify the construction of devices of this character while securing both simplicity of action and durability.

Figure 1:
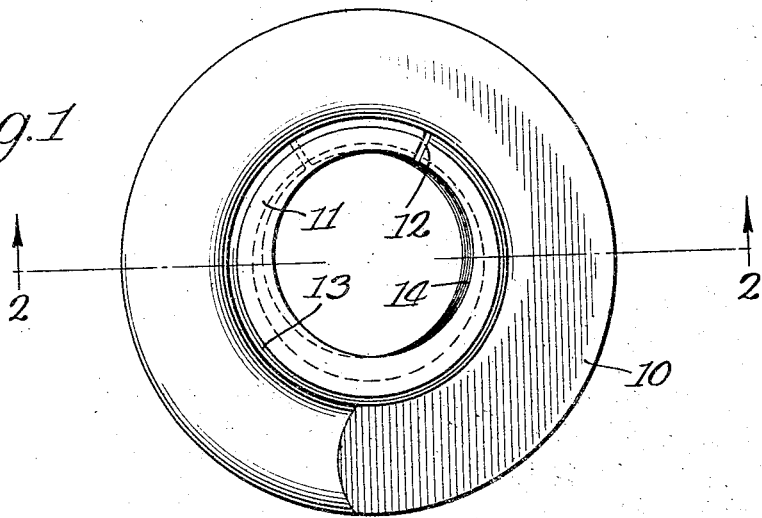
Figure 2:
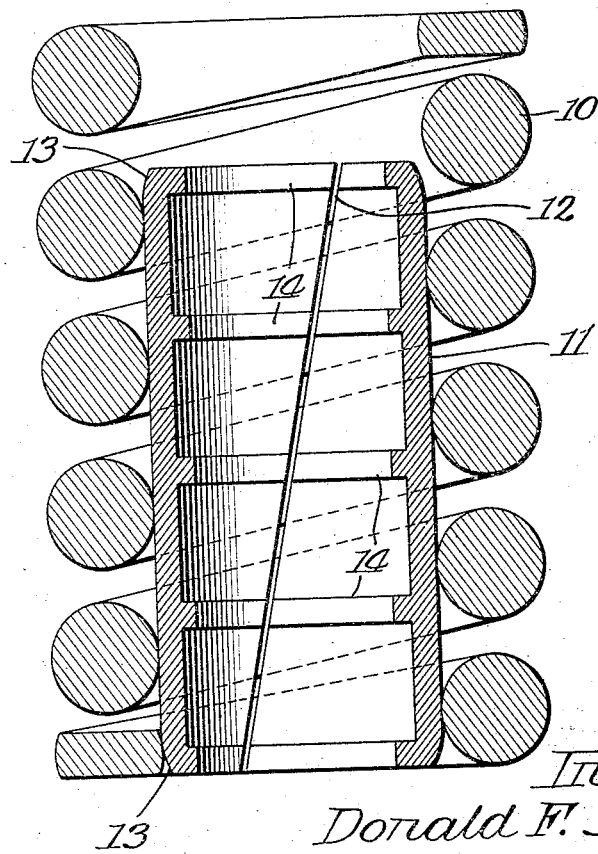

The invention is hereinafter described, and is illustrated in the accompanying drawing, in which Fig. 1 is a plan view of the device; and
Fig. 2 is a sectional view on the line 2—2 of Fig. 1.

The device consists of a helical spring 10, adapted to be introduced between a car bolster and the bottom arch of the side frame of a truck, and a hollow metallic cylinder 11 of less length than the spring and fitting within its bore. The element 11 is longitudinally split from end to end, as shown at 12, and, before assembly, is out of round.

Upon assembling the parts the element 11 is sufficiently compressed to permit its end, which is preferably externally beveled, as shown at 13, to enter the bore of the spring. Longitudinal pressure being now applied the element 11 is forced into the spring, being radially contracted and the spring being radially expanded. Upon compression of the spring in service friction is developed between its several coils and the cylinder, by reason of the tendency of each to resume its normal radial dimension.

The element 11 may be stiffened radially by providing it with the internal transverse ribs 14. Upon release the spring expands to its normal dimension of service; the cylinder may be carried upwardly to some extent, but the subsequent action on compression remains the same, as it will be carried downwardly by the impact of the bolster until it engages the lower spring seat. The length of the cylinder is such that it serves as a positive stop to prevent overcompression of the spring and the upper and lowermost ribs 14 function as abutment members for receiving the impact when the spring is compressed beyond a predetermined amount thus preventing breaking, bending or distorting the ends of the cylinder.

The device is simple and cheap of manufacture, and reliable and efficient in its action.

I claim as my invention—

In a cushioning device, in combination a hollow cylindrical member having a solid metal wall provided with a slot extending lengthwise of said member, a plurality of ribs extending circumferentially of said member for yieldingly resisting radial distortion of said member, the upper and lowermost ribs constituting abutments at the ends of said member and a spiral spring concentric with said member and normally distorting the same radially, the length of the cylindrical member relative to the spring being such as to limit the compression thereof.

In testimony whereof I affix my signature.

DONALD F. SPROUL.